Fig. 1

INVENTORS
David T. Green
Philip W. King

United States Patent Office 3,490,675
Patented Jan. 20, 1970

3,490,675
INSTRUMENT FOR PLACING LATERAL GASTROINTESTINAL ANASTOMOSES
David T. Green, Norwalk, and Phillip W. King, Cheshire, Conn., assignors to United States Surgical Corporation, Baltimore, Md., a corporation of Maryland
Filed Oct. 10, 1966, Ser. No. 585,672
Int. Cl. B31b *1/00*
U.S. Cl. 227—19    25 Claims

ABSTRACT OF THE DISCLOSURE

There is disclosed a surgical instrument for combining the action of two hollow body organs having their longitudinal axes parallel to one another. The instrument is properly placed with respect to the two hollow body organs, staples together the walls of said organs and effects a cut extending entirely through the two stapled walls.

---

The present application is directed to improvements in a surgical instrument, specifically a stapler, for simultaneously effecting a plurality of lateral lines of sutures or "stitches" in body organs, said instrument being of the type disclosed in Bobrov, United States Patent 3,079,606.

In some surgical operations it is necessary to adjoin two hollow body organs alongside each other, generally speaking with their longitudinal axes parallel to each other, and to effect a longitudinal cut through the contacting circumferential walls of the two organs in order to open them to each other whereby the two organs constitute a single hollow chamber along the length of the cut. Correspondingly, the circumferential portions of the two adjoining organs on each lateral side of the cut must be sutured by at least one line of "stitches" in order to maintain the integrity of the union.

Instruments for this purpose comprise two elongate fingers which are respectively insertable into each organ from an open end thereof, the two fingers thereby having between them the two adjoining walls of the organs. One of the fingers comprises a disposable cartridge carrying a plurality of staples arranged in at least two lateral rows while the other finger comprises an anvil for curling the staple legs into hook form upon their being driven against said anvil. The stapling operation is effected by a pusher means which travels longitudinally along the cartridge carrying finger extending into one organ, said pusher means simultaneously acting upon the staples at a corresponding longitudinal position in each lateral row but successively acting upon the staples following along the rows. In other words, if two lateral rows of staples are provided, each row comprising twenty staples, the pusher means acts upon two staples at a time, one in each row, and successively acts upon each succeeding pair of staples.

Immediately behind the pusher means and laterally positioned between the staple rows is a knife member which severs the facing adjoining walls of the two organs to thereby longitudinally open the two organs to each other between the rows of staples.

In known instruments of this type, a difficulty has been encountered in the reliability and effectiveness of the knife member, especially since the organ membrane has frequently "bunched up" or accumulated in front of the knife and prevented the realization of a clean cut in addition to causing jamming in the instrument.

It is, therefore, one of the objects of this invention to provide an improved knife arrangement to assure a clean cut and to avoid jamming in the instrument.

The aforementioned pusher means acts upon the individual staples through individual pusher plates, one of which bears against the back or cross-leg of each staple. These pusher plates each comprise a sliding surface across which the pusher means slides and thereby pushes said plates in a direction perpendicular to the sliding movement of the pushed means. This relationship of moving parts is such that it has resulted in tilting of the pusher plates about their axis and in consequent digging in of the corners thereof along the plate guide means. This, in turn, has resulted in jamming of the pusher plates along said guide means.

It is another object of this invention, therefore, to provide an improved sliding contact arrangement between pusher plates and pusher means therefor which reduces tendency of the plates to tilt. In this regard, it is also an object of this invention to provide an improved guiding means for the pusher plates.

Surgical staplers must be easily and rapidly disassemblable and re-assemblable. Those of the type described herein comprise an upper and lower frame and a movable handle which serves as a locking and tightening means for holding the two frames together.

It is an object of this invention to provide an improved, highly reliable and easily manipulable handle means for the above-mentioned purposes.

In surgical staplers, it is highly desirable that the staple-holding cartridge, the staple pusher means, and the anvil be packaged as a unitary coordinated grouping, in pre-sterilized condition and ready to be immediately mounted onto the instrument. It is an object of this invention, therefore, to provide an anvil, cartridge, and pusher means which are inexpensive to manufacture and which may be packaged as a disposable, unitary grouping. In this regard, it is an object of this invention to provide a very simple and yet effective and reliable construction of the parts.

It is further an object of this invention to provide a stop means in the cartridge so as to obviate inadvertent advancing of the pusher means through the cartridge.

These and other objects are inherent in the herein disclosed instrument, a detailed description of which follows, said description being referred to the appended drawings, wherein:

Referring to the drawings which relate to a preferred embodiment of realization, the instrument comprises a staple carrying and ejection unit generally indicated as 100. Unit 100 comprises an elongated, and which in cross section is U-shaped, cartridge 102 which is provided with a plurality of parallel spaced slots 104 extending through each leg thereof. Cartridge 102 is made of a plastic such as Lexan and the like and is provided with an enlarged nose 106 which facilitates easy insertion of the instrument into the hollow organ. Each slot 104 comprises a wide staple-seating groove 108, which is dimensioned to receive and guide a surgical staple 110.

A staple drive member 118 is provided near the top of each slot 104 behind the staple 110 seated therein. Each drive member has a rectangular pusher plate 120 with a V-shaped cam portion 121 mounted on one face thereof. As seen in the figures, the thickness and width of pusher plate 120 is such that it fits closely within slot 104 so as to be positively guided during its downward movement in said slot. In addition, the forward and rear ends of plate 120 include relative narrower rail portions 136 which ride along and in the grooves 137 in the end walls of the staple slots 104.

The rails 136 and grooves 137 are provided in order to absorb any forces which tend to turn the cams 118 about their vertical axis. On the other hand, it will be noted that the V-shaped cam surface 121 is a straight line surface and that the angle of the V-sides to the horizontal is greater than the angle γ of the cam member 44 on the pusher assembly. This relationship of parts results in a point contact between cam 121 and cam member 44, this point contact occurring along the central vertical axis of cam member 118 and thereby obviating to a great extent any tendency for the member 118 to be tilted about its horizontal axis, which tilting would lead to digging in of the corners of 118 into the walls of slots 104 and eventual jamming of pusher members 118 in slots 104. Further to avoid any such digging in, the corners 138 of the rails 136 are rounded.

It should be noted that tilting of member 118 about its horizontal axis would normally occur or be induced if any contact between cam 121 and cam member 44 occurred along a vertical axis displaced from the central vertical axis of member 118. Such contact and consequent tilting is normal in prior art instruments wherein surface 121 would be convexly curved. The bottom of pusher plate 120 is concavely recessed at 120' where it engages the cross-leg of staple 110 to force said staple downward during the operation of the instrument. As seen in the drawing, the cam portions 121 face inwardly and extend partially within the center space 126 of cartridge 102. It is seen that there are four longitudinal rows of staple carrying slots 104 and consequently four rows of pusher plates 120 in related slots 104. Each pair of rows of slots 104 is arranged with the pushers 118 facing each other as afore-described and with the cam portions 121 extending into center space 126.

Figure 1:
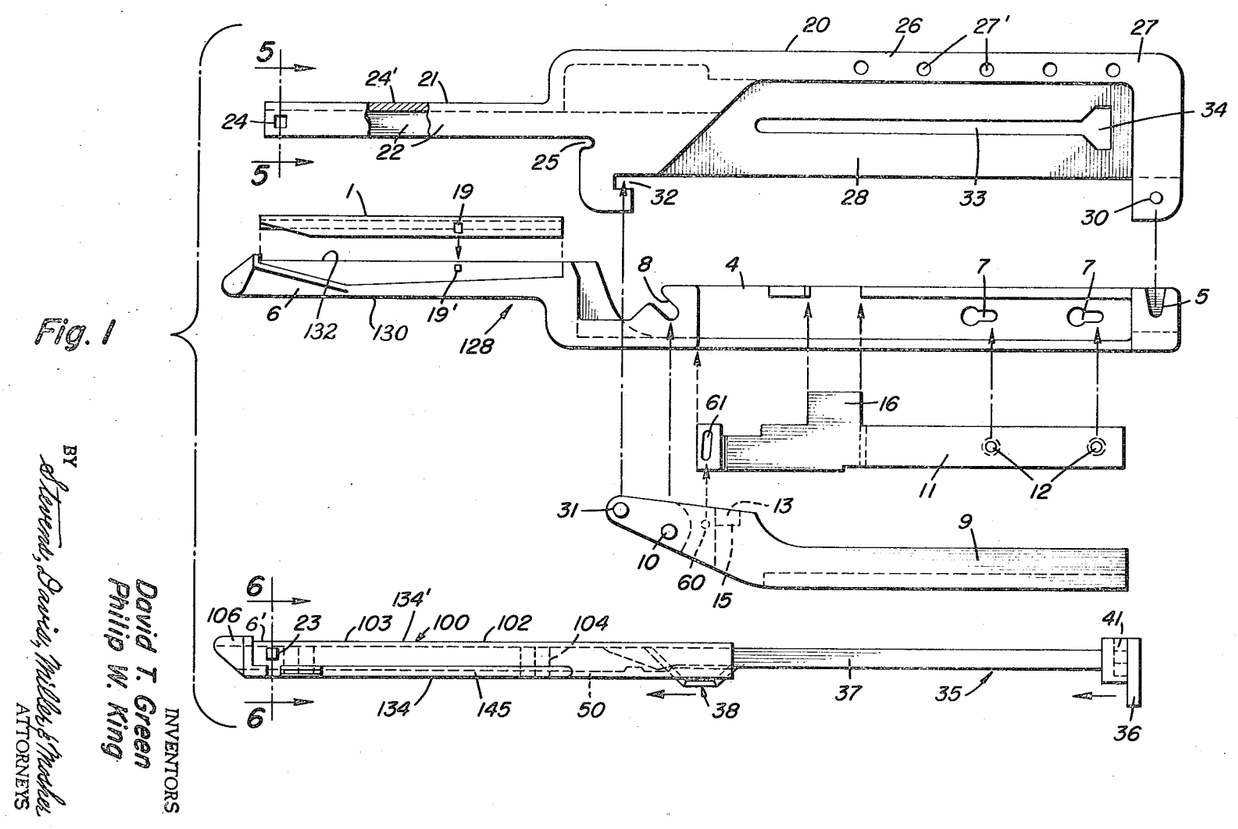
FIGURE 1 is a side elevation of the parts of the instrument disassembled.
Figures 2, 7:
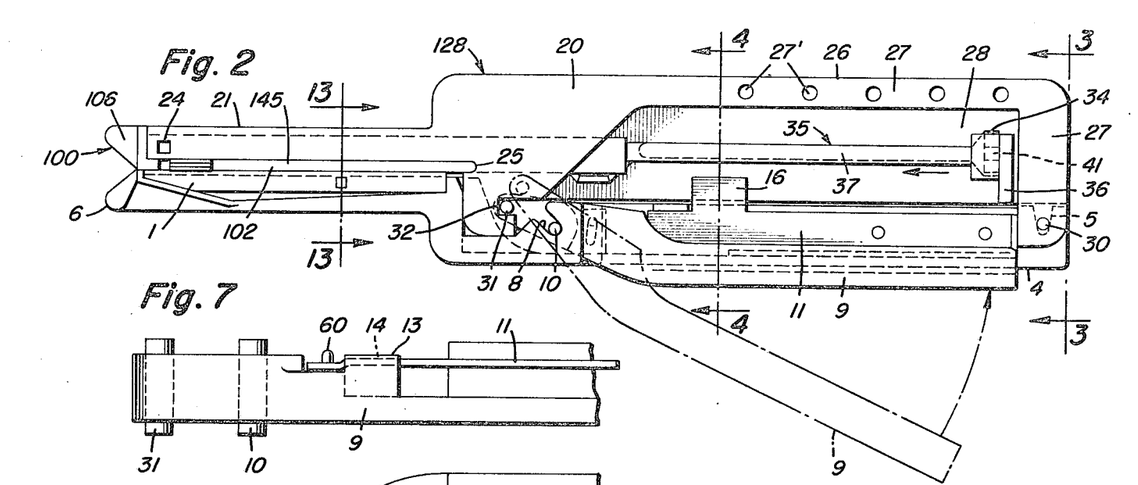
FIGURE 2 is a side elevation showing the parts assembled.
FIGURE 7 is a top plan view of the handle and spring handle.
Figure 3:
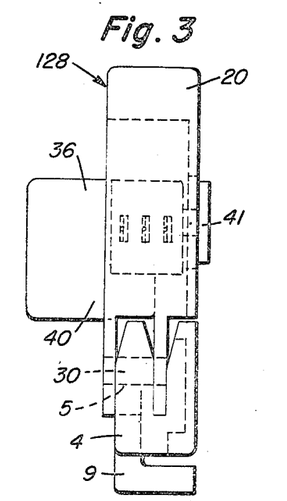
FIGURE 3 is a rear end elevation taken along line 3—3 of FIGURE 2.
Figure 4:
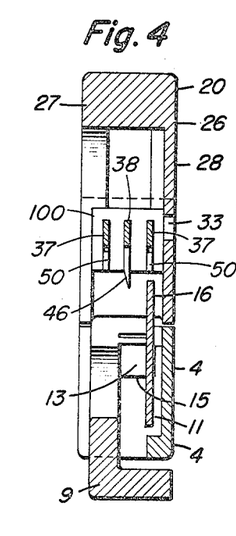
FIGURE 4 is a view in section taken along line 4—4 of FIGURE 2.
Figures 5, 6:
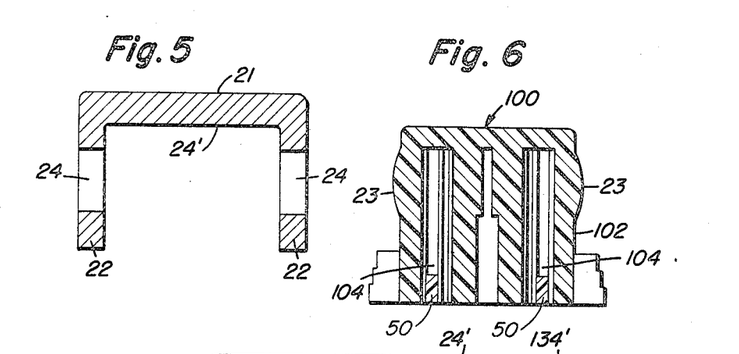
FIGURE 5 is a sectional view taken along line 5—5 of FIGURE 1.
FIGURE 6 is a view in section taken along line 6—6 of FIGURE 1.
Figures 8, 9:
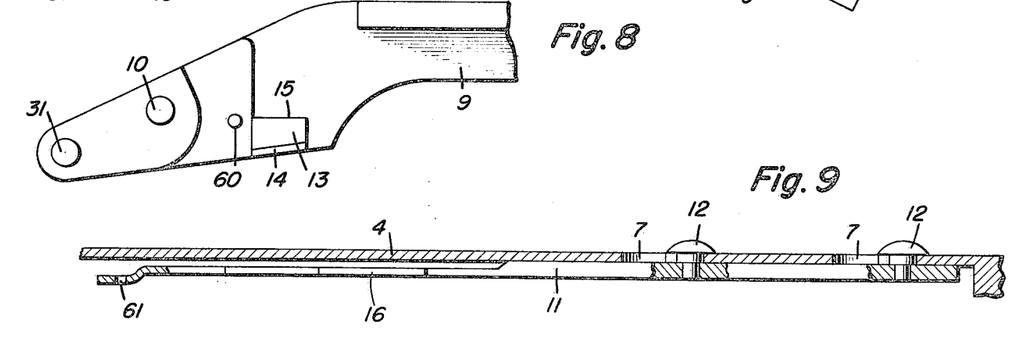
FIGURE 8 is a side elevation of a fragment of the handle and handle spring.
FIGURE 9 is a longitudinal horizontal section through the handle spring showing how it is mounted on the lower frame.

Referring to FIGURES 1 and 2, there is illustrated a medical instrument generally indicated as 128 which comprises a lower elongated jaw frame 130 including a forward end 6 which along its longitudinal center line includes an elongated groove 132 for receiving a corresponding portion of a disposable anvil therein. The anvil 1 includes a plurality of staple shaping depressions 2.

The rear portion 4 of the lower frame is elongate and rather narrow in form as seen in top view. At its rearwadmost end the lower frame includes a vertical slot 5 while slightly forward therefrom its includes a pair of horizontally disposed key slots 7 in the lateral wall thereof.

In the region at which the forward and rear portions 6 and 4 join together, the lower frame includes a forwardly-upwardly inclined slot 8. Slots 5 and 8 are open ended at their upper ends.

A handle 9 is received along the side of lower frame portion 4 with pivot pin 10 on said handle being seated at the bottom of inclined slot 8. Between the handle and the frame portion 4 is a spring 11 which includes a pair of mushroom-head pins 12 at one end thereof, the head of said pins being received through key hole slots 7 and thereby holding the spring in place. Handle 9 includes a catch means 13 along its inner side which faces the spring 11, said catch means being defined by an inclined surface 14 which can slide along the spring surface when the handle is pivoted counterclockwise or upwardly, and by a horizontal surface 15 which catches over the top edge of the spring and prevents the handle from falling downward (clockwise). In order to release the handle, it is simply necessary to press laterally against extension 16 on the spring.

The disposal anvil 1 which is snapable onto portion 6 of the lower frame is seen to comprise an elongate unitary member including four rows of stape-shaping grooves 2, each pair of rows being separated by a knife groove 17. The anvil includes opposed legs 18 which at spaced locations along their inner sides include inward bosses 19 which are received in corresponding recesses 19' along the outer side walls of lower frame portion 6 in order to properly align the anvil on the instrument.

The staple-shaping grooves 2 include a fairing or lead-in 2' along their upper edge in order to properly guide the staple into the base of the groove and to prevent jamming of said staple upon the upper surface 2a of the anvil. The fairing may be restricted to extend only from the outer edges 2b to midway between said outer edges and the middle axis 2c of the groove, this being the entry portion of the groove, and the remaining or exit portion of the groove thereby providing positive guiding of the staple as it is being curled upwardly for the full depth of the groove.

The disposable cartridge assembly 100 is mounted on the forward portion 21 of the upper frame 20 and is held between the downwardly extending side walls 22 thereof. Said forward portion 21 defines channel member adapted to receive the cartridge assembly 100 therein. When the cartridge member is fully seated in the upper frame channel, the protrusions 23 on the forward end of the cartridge extend laterally into the respective openings 24 at the forward end of the side walls 22. This inter-engagement of protrusions 23 with openings 24 establishes the proper positioning and alignment of the cartridge relative to the anvil. Since the cartridge is of "Lexan" plastic, it is resiliently deformable to permit elements 23 to snap into holes 24.

The top of the cartridge nose 106 is raised or higher than the top 103 of the cartridge 102 to an extent equal to the thickness of the channel cross-leg 24' so that, when the unit 100 is mounted on the upper frame, the upper surfaces of nose 106 and cross leg 24' form a smooth, continuous surface which avoids snagging when the forward portion 21 is inserted into or withdrawn from a hollow organ. It will be noted that the nose portion 6' of the bottom frame also is shaped so as to form a smooth surface for this same purpose.

Cartridge 102 also includes a rearward extending ledge 145 which is received in channel 25 in the upper frame, this securing the rear end of the unit 100 against displacement relative to the frame.

The rear portion 26 of the upper frame comprises, in vertical elevation, a generally elongate body member defined on three sides by a peripheral rim portion 27 which borders a relatively thin plate portion 28. A pin 30 in the lower rear end of the rim portion 27 is adapted to be received in the bottom of slot 5 in the lower frame to thereby form a guide-pivot means for these two portions while slot 32 in the forward lower end of the rim portion 27 serves to lock their forward ends together as will presently be described.

The operation and assembly of the disclosed embodiment is as follows.

As is seen in the bottom of FIGURE 1, cartridge assembly 100 and the pusher assembly are pre-assembled as a unitary disposable grouping of parts. The cartridge assembly 100 includes the staples mounted in each of the staple slots and a pusher plate in each slot behind each staple. In order to load the cartridge 102, each pusher plate 118 is first loaded into the slots 104 through the tissue side 134 of the cartridge, after which each staple is loaded into said slots. The opposite or frame side 134' of the cartridge is closed so that the pusher plates 118 cannot fall out the back side of said cartridge, however, there is nothing to prevent their falling out from the open tissue side 134 after the staples have been pushed out of the slots pursuant to a stapling operation, excepting retaining bars 50.

Figures 10, 10A, 12, 15:
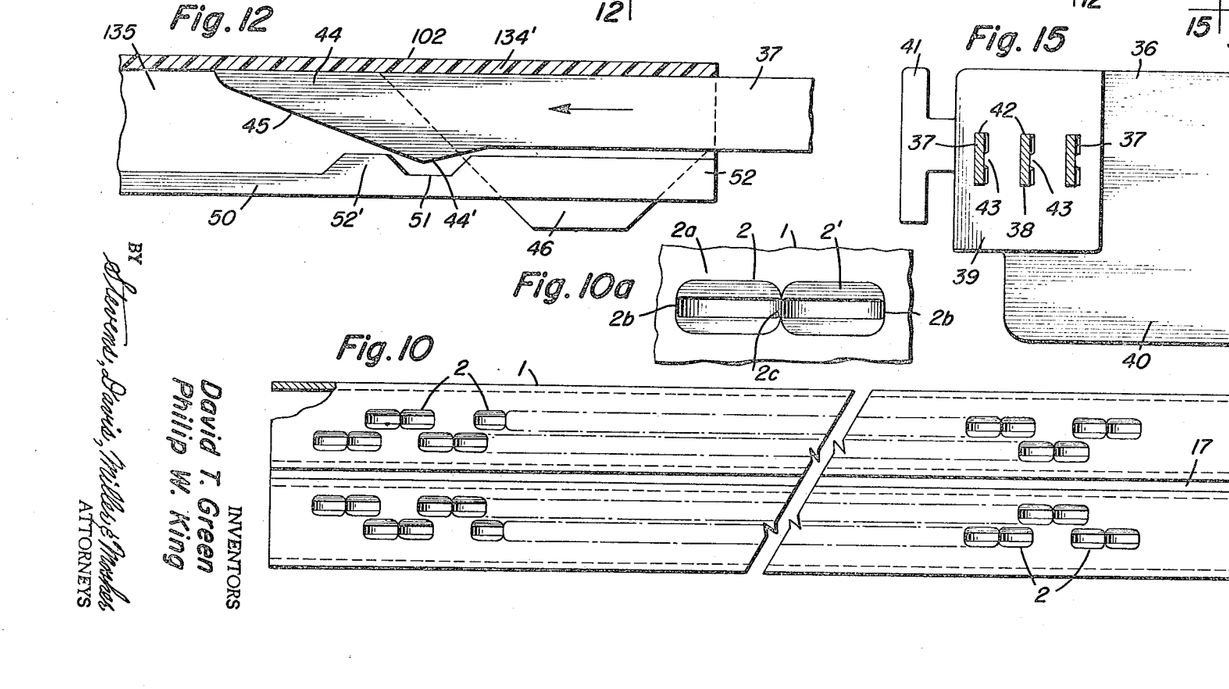
FIGURE 10 is a top plan view of the anvil.
FIGURE 10a is an enlarged plan view of a staple shaping groove in the anvil.
FIGURE 12 is a section taken along line 12—12 of FIGURE 11 (to show the retaining bar)
FIGURE 15 is a view in section taken along line 15—15 of FIGURE 11.
Figure 11:
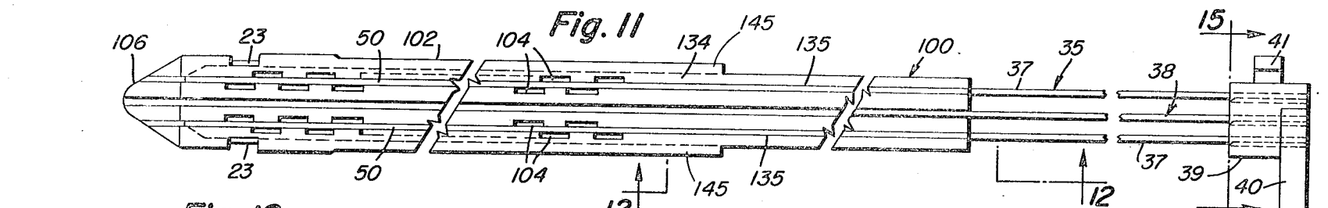
FIGURE 11 is a bottom plan view of the cartridge.
Figure 13:
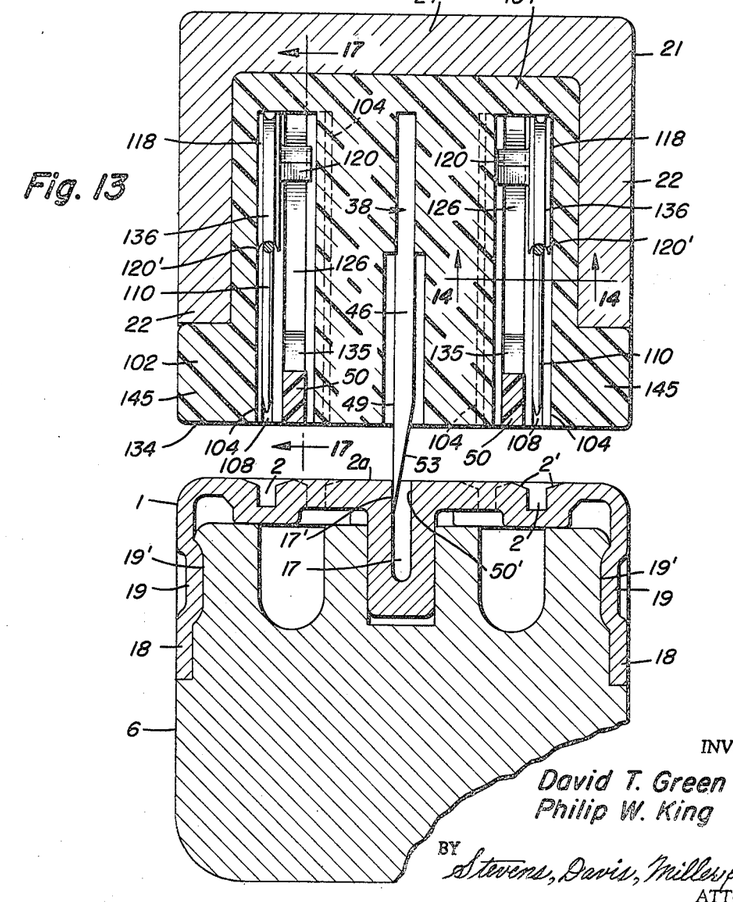
FIGURE 13 is a sectional view taken along line 13—13 of FIGURE 2.
Figure 14:
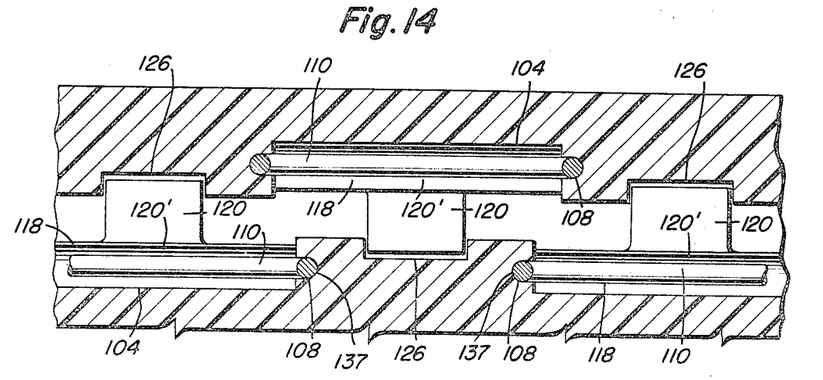
FIGURE 14 is a sectional view taken along line 14—14 of FIGURE 13.
Figure 16:
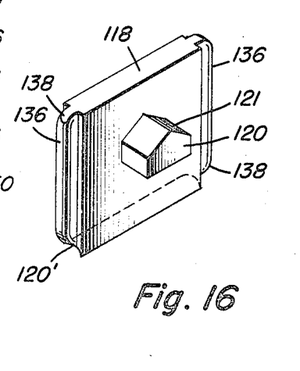
FIGURE 16 is an isometric view of a pusher element.
Figure 17:
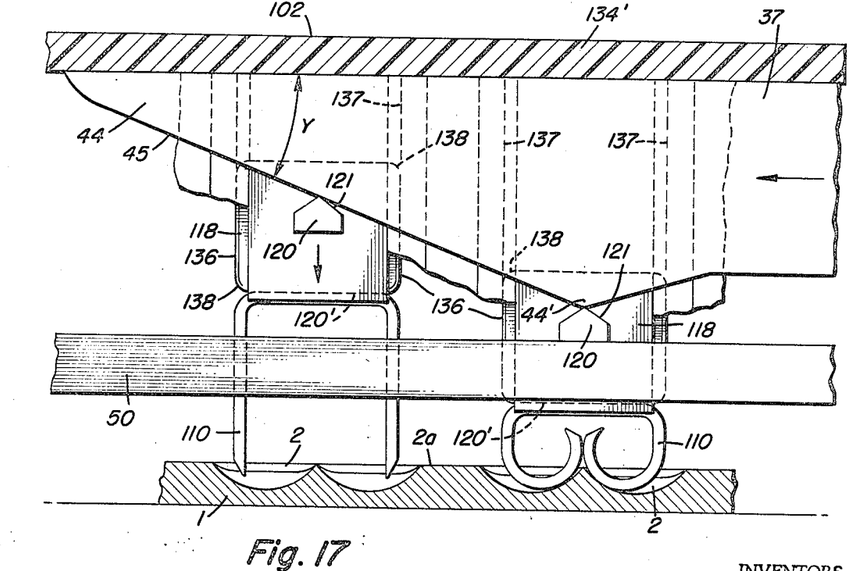
FIGURE 17 is a sectional view taken along line 17—17 of FIGURE 13.

Retaining bar 50 is seen in FIGURE 12 to comprise a plastic elongate member, rectangular in cross section and having a recess 51 adjacent to a humped portion 52 close to one end of said bar. A bar 50 is slid longitudinally into each of the longitudinal passageways 135 which are formed between each two adjacent rows of pusher plate slots. The bars 50, therefore, do not interfere with the staples since the staple slots 104 are laterally spaced from the plane of passageways 135. The pusher plate cam portions 121, however, move in a plane which goes through the cross section of bars 50 so that said portions 121 come to rest upon said bars after the staples have been driven out of slots 104.

The pre-loading of the cartridge, therefore, simply comprises first fitting the pusher plates 118 one into each slot 104, followed by the staples, and finally followed by retaining bars 50 being slid lengthwise into passageways 135.

Additionally, the pusher assembly 35 is also preassembled with the cartridge assembly as follows. The pusher elements cam members 44 are each inserted into passageways 135 until the hump portion 44' of the cam member 44 is located in recess 51 between the two hump portions 52, 52' on either side of said recess. In this position, the pusher assembly 35 cannot move longitudinally unless forcibly pushed so that portion 44' rides over either hump 52 or 52'. It is seen, therefore, that pusher assembly 35 is effectively releasably locked in place so that it cannot inadvertently either fall out of the cartridge or be pushed forwardly therethrough which would result in the staples being pushed out of their slots 104.

This assembly of the pusher assembly and of the cartridge assembly in addition to the anvil constitute a disposable pre-sterilized, unitary grouping which is packaged and delivered as such.

Upon the need for the disposable grouping arising, the instrument is assembled as follows.

Primarily, the anvil 1 and the combined cartridge and pusher assembly are respectively mounted in the lower and upper frame portions 6 and 20 while the upper and lower frames are apart from each other. The combined cartridge and pusher assembly are not necessarily separated from each other in order to be mounted onto the upper frame. In fact, the combined assembly 100, 35 shown in the bottom of FIGURE 1 is taken as a unit and mounted onto upper frame 20 as follows.

Cartridge assembly 100 is first pushed upwardly into the channel defined by frame portion 21. Then said assembly 100 is slid longitudinally backwards so as to cause ledge 145 to slide into channel 25 in the upper frame, and at the same time protrusions 23 snap into openings 24.

The T-shaped portion 41 on the pusher assembly head is then fitted into opening 34 so that the pusher head assembly is in position to be guided along slot 33.

The spring 11 and the handle 9 are now assembled onto the lower frame with the mushroom-headed pins 12 on the spring extending into key hole slots 7, which pin 10 on the handle seated in slot 8, and with pin 60 on the handle extending into slot 61.

The upper frame pin 30 is then seated within lower frame slot 5 with the two frames "jackknifed" apart, their rear ends together and their forward ends spaced apart. The two frame forward portions 6 and 21 are then inserted into the hollow organ which is to be sutured (in fact, the insertion may occur prior to seating of pin 30 in slot 5), and the two frames are then pivoted together about pin 30, their forward ends coming together. The handle 9 is now at about a four-o'clock position relative to the axis of pin 10. At this point, the cam pin 31 on the handle is received at the entrance to upper frame slot 32. The operator, at this point, pulls the handle upwardly to a three-o'clock position relative to pin 10, this movement causing the cam pin 31 to press downwardly in slot 32 thereby camming and locking the forward end of upper and lower frame portions together. The membrane which is to be sutured is thereby clamped between the facing cartridge and anvil surfaces, and said surfaces are spaced apart the correct distance for performing the stapling operation. At this point, therefore, the surgeon may push forwardly upon the pusher assembly 35 which will bring about the suturing operation. The assembly 35 is pushed all the way forwardly and then returned to its starting position, at which point the two frames are released from each other and withdrawn from the body organ which has been sutured. Release of the two frames occurs simply through the exertion of a laterally directed, finger-applied force against portion 16 of spring 11 and consequent clockwise pivoting of handle 9.

The frame forward portions 6 and 21 constitute forwardly extending fingers while the two frame rear portions, when assembled, constitute a hand grip or handle portion.

The handle 9 is held in the three-o'clock position by virtue of surface 15 on said handle resting upon the upper edge of spring 11. In order to release the handle so that it will fall clockwise, it is merely necessary to press laterally against portion 16 on the spring in order to displace its upper edge laterally from beneath the surface 15.

The engagement of pin 60 in slot 61 serves to fix the location of the pivot axis of the handle.

Upper frame plate portion 28 includes a longitudinally extending slot 33 having an enlarged rear entrance portion 34, said slot serving to guide the pusher assembly 35 which, in turn, serves to push the staples out of the cartridge slots and also to cut the membrane centrally between the rows of staples.

The pusher assembly comprises a head portion 36 from which perpendicularly extend two identical laterally spaced pusher elements 37 and a knife member 38 laterally intermediate said elements. The elements 37 and knife member 38 are force fitted in the head 36 to form a rigid integral assembly which is easily replaceable and, in fact, disposable. The head 36 is preferably made of "Lexan" plastic, molded in one piece, and includes a body portion 39, a grip portion 40, and a T-shaped mounting portion 41 which fits through enlarged slot portion 34 and which serves to hold the assembly on the upper frame with portion 41 sliding along slot 33. Body portion 39 includes three longitudinally extending slots 42, each formed with an integral rib 43 therealong. These ribs are resiliently compressed by the tong portions of the push bars 37 and of knife member 38 (these last three parts being of stainless steel) being fitted within slots 42, this serving to hold the respective pusher assembly parts together.

Pusher elements 37 each comprise a cam member 44 at their forward ends, said cam member including an inclined forward edge 45 which slides over the V-shaped cam portions 121 which extend from the pusher plates 120, thereby pushing said plates downwardly as each respective cam advances forwardly between respective facing rows of pusher element. As the inclined forward edge 45 engages each successive cam portion 121, the latter is forced downwardly due to the relative movement between said edge and said portion. In this manner, each pusher plate 120 is forced downwardly in its respective channel 104, whereby the lower end of plate 120 forces its associated staple 110 downwardly through slot 108. After the legs of staple 110 pierce through the layers of organ tissue, they are forced to conform to the grooves 2 in the anvil surface; the legs are thereby turned inward and under as pusher plate 120 continues to lower in response to the forward moving edge 45. The plates move downwardly as each respective cam advances forwardly between respective facing rows of pusher elements.

Knife member 38 comprises a blade 46 which includes forward 47 and rear 48 cutting edges so that it may perform a cutting action during both its strokes, that is, during the forward stroke of the pusher assembly and also during its return stroke along the unit 100. This return stroke cutting action is not always essential; however, it is beneficial in the event that the forward stroke cutting action is not totally effective. Blade 46 is located rearwardly of cams 44 so that the cutting action occurs only between staples which have already been driven into the membrane and bent by the anvil into final form.

It should here be noted that knife edges 47 and 48 are inclined downwardly and from front to rear relative to the stroke direction and, further, that they are not V-shaped in end view but, instead, are formed by one vertical side 49 and one inclined side 50 analogously to a shearing edge. The importance of this is seen when referred to the knife groove 17 in the anvil. In previous instruments, the knife edge was V-shaped with its point extending centrally into the knife groove. This meant that the cutting action occurred along the centerline of the knife groove in the anvil, and it was possible, therefore, for tissue, membrane, etc., of the organs to "bunch up" between the sides of the knife edge and the lateral sides of the anvil knife groove. This has often resulted in ragged cutting action, as well as jamming of the knife.

According to this invention, on the other hand, the vertical knife side 49 slides flush against one side 17' of anvil groove 17 so that a shearing effect results between knife side 49 and groove side 17' without the possibility of any material being able to accumulate and jam between said sides. In fact, according to the presently disclosed blade configuration, there is an inherent tendency for the blade side 49 to be pressed flush against groove side 17' by the membrane between blade side 50 and groove side 50'. This pressing action assures a more perfect shearing and cutting effect.

Figure 18:
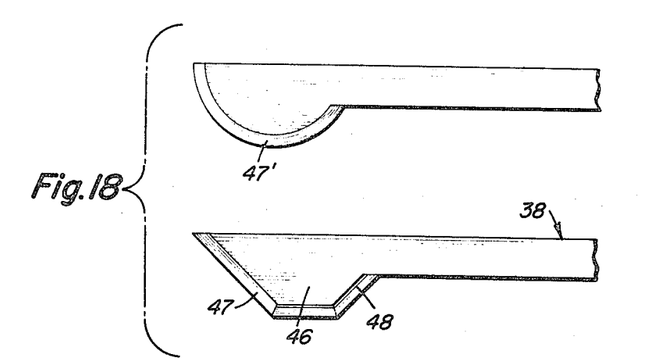
FIGURE 18 shows two versions of the knife blade.

The knife blade may be either straight edge or formed from a continuous curved edge 47'.

The upper frame 20 includes holes 27' along the rim portion 27, these holes being adapted to act as successive fulcrum supports for a special lever which would be passed behind the pusher assembly head 36 and used to provide greater leverage than that provided by head 36 alone in the instance of suturing a particularly tough membrane.

After the instrument has been removed from the organ, unit 100, together with pusher assembly 35 and anvil 1, is removed and disposed of. At this time, the instrument is prepared to receive another fully loaded unit 100, together with a new anvil and new pusher assembly 35.

The invention may be embodied in other specific forms without departing from the spirit or essential characteristics thereof. The present embodiment is, therefore, to be considered in all respects as illustrative and not restrictive, the scope of the invention being indicated by the appended claims rather than the foregoing description, and all changes which come within the meaning and range of equivalency of the claims are, therefore, to be embraced therein.

What is claimed is:

1. A surgical stapler comprising a pair of elongate fingers extending longitudinally alongside each other, an anvil member mounted along one of said fingers in facing relationship to a staple-carrying cartridge mounted along the other of said fingers, said anvil comprising a plurality of longitudinal rows of staple shaping grooves, and a knife groove extending longitudinally along the surface of said anvil laterally intermediate said rows of staple shaping grooves, said knife groove being defined on one lateral side by a straight vertically extending wall, a knife member including a blade extending downwardly into said knife groove, said blade having a cutting edge defined by a first side which is parallel to said straight wall and by a second side which is inclined relative to said wall, means for advancing said blade along said knife groove with said first side sliding flush against said straight wall, said advancing means comprising a pusher assembly including a head guidingly mounted in said handle portion, a pair of elongate cam members rigidly mounted in said head and laterally spaced in parallel relation to each other, said knife member being an elongate member rigidly mounted at one end thereof in said head and extending longitudinally therefrom parallel to and laterally intermediate said cam members, said blade extending downwardly from the other end of said knife member, said cartridge comprising a row of staple holding slots corresponding to each said row of anvil grooves, a pusher element in each said slot behind a staple therein, said pusher assembly being movable in a longitudinal direction relative to said handle portion.

2. The surgical stapler of claim 1, said pusher element comprising a rectangular plate portion vertically slidable in said slot, a cam portion extending laterally from said plate portion, said cam portion comprising a rectilinear cam surface and said cam member comprising a rectilinear cam surface, said rectilinear surfaces being arranged to slide past each other with only point contact occurring therebetween at the central vertical axis of said element upon said cam member being moved in said longitudinal direction.

3. The surgical stapler of claim 2, said cam portion being V-shaped symmetrically about the central vertical axis of said element, said cam member being arranged to move perpendicularly to said vertical axis and in sliding contact with the apex of the aforementioned V-shape.

4. The surgical stapler of claim 1, said cartridge comprising four rows of staple holding slots and said anvil comprising two rows of said slot shaping grooves on each side of said knife groove, each said cam member being arranged to actuate the pusher elements in two adjacent rows of staple holding slots.

5. The surgical stapler of claim 1, the staple holding slots in adjacent rows thereof being longitudinal staggered relative to each other.

6. The surgical stapler of claim 1, said head together with said cam members and said knife member constituting a disposable assembly.

7. The surgical stapler of claim 1, said blade including a forward and a rear said cutting edge whereby said blade is adapted to effect a cutting action while moving in either of two opposed longitudinal directions.

8. The surgical stapler of claim 1, said head being made of a plastic material and including slots in each of which is respectively mounted one end of each said cam members and said knife member, rib means along each slot resiliently deformed by and pressing against the respective said ends.

9. A surgical stapler comprising an upper and a lower frame member releasably lockable with each other along engaging longitudinal edges thereof, said frame members each including an elongate hand grip portion having a forward and a rear end, an elongate finger portion extending forward from the said forward end of each said hand grip portion, each said finger portion respectively being adapted to mount a cartridge assembly and an anvil, the rear end of said hand grip portions comprising pivot means for pivoting one of said frame members in the other thereof, a latch means for releasably locking the forward ends of said hand grip portions relative to each other, said latch means comprising a handle having two pins extending laterally therefrom in the vicinity of one end thereof, a first of these pins being a pivot pin and pivotally mounting said handle on one of said frame members, a slot in the other of said frame members, the other of said pins being a cam pin and being adapted to engage in said slot, said handle being pivotable about said pivot pin and with said cam pin engaged in said slot in a direction whereby said frame members are pressed together along said edges thereof.

10. The surgical stapler of claim 9, said pivot pin being pivotally seated in an open ended slot in said one frame member whereby said handle and pivot pin are removable from said one frame member.

11. The surgical stapler of claim 10, said open ended slot extending upwardly and forwardly relative to the longitudinal axis of said frame members, the open end of said slot being the upper one, and said slot in said other frame member also being open ended and extending substantially parallel to said longitudinal axis.

12. The surgical stapler of claim 9, including a handle lock means for holding said handle in the position whereby said frame members are pressed together, said handle lock means comprising a flat spring blade mounted between said handle and said one frame member, the plane of said blade extending substantially perpendicularly to the pivot axis of said handle, a sliding surface on said handle adapted to slide along one side of said blade, an abutment surface on said handle extending substantially parallel to said pivot axis and being adapted to rest against one edge of said blade, said blade lying in the path which said abutment surface defines pursuant to pivoting of said handle, said blade being resiliently deformable out of said path, hand grip means to so deform said blade.

13. The surgical stapler of claim 9, said pivot means comprising a pivot pin in one of said frame members and an open ended vertically extending slot in the other of said frame members, said pin being pivotally seatable in the bottom of the last mentioned slot.

14. A combined cartridge and pusher assembly for use in surgical staplers, comprising: a cartridge including a plurality of staple-holding slots arranged in a longitudinal row therealong and open at one face of said cartridge, a pusher element slidingly mounted in each said slot and loadable thereinto from said one face of said cartridge, a cam portion on each said element extending transversely to the axis of said slots, a longitudinal passageway through said cartridge in the plane of said cam portions, a retaining element fitted along said passageway adjacent to said one face comprising an elongate member slidable into said passageway in a longitudinal direction from one end of said cartridge.

15. The assembly of claim 14, including an elongate cam member slidable in the plane of said passageway longitudinally along said cartridge, means releasably locking said cam member in one end of said pasageway.

16. The assembly of claim 15, said locking means comprising a recess in said retaining member bounded by two hump portions, a hump on said cam member received in said recess, said hump portions being of resilient yieldable material and said cam member being releasable from said retaining member through being urged over either said hump portion.

17. The combined assembly of claim 15, including a pusher head, a pair of said elongate cam members and a knife member rigidly mounted in said head and laterally parallely spaced from each other, said head being of solid plastic material and including slots and rib means along said slots, said cam members and knife members each extending into a respective one of said slots in said head and each resiliently deforming the rib means therein, said cam members extending into a respective one of said passageways in said cartridge and engaged therein by a respective one of said locking means, a knife groove in said cartridge parallely between said passageways, said knife member extending into one end of said knife groove.

18. The surgical stapler of claim 1, said pusher element plate portion including a rail along its opposite ends extending in the direction of movement of said elements, a groove along each end of said slots, said rails being slidably received and guided in said slots.

19. The surgical stapler of claim 12, including a slot in said blade and a pin fixed on said handle and extending into said slot, said slot thereby restricting displacement of the pivot axis of said handle.

20. The surgical stapler of claim 2, said rectilinear cam surfaces on said pusher element and on said cam member each forming an acute angle relative to the longitudinal axis along which said came member travels, the angle of the pusher element surface being greater than that of the cam member surface.

21. A cartridge assembly for a surgical stapler, comprising: an elongate cartridge including a plurality of slots arranged in parallel longitudinal rows, a pusher element in each slot slidable therein in a direction perpendicular to the longitudinal axis of said cartridge, a cam portion on each element, the cam portions of the pusher elements in adjacent parallel rows of slots extending towards each other into a longitudinal passageway intermediate two said rows of slots, said slots having an open end at one longitudinal face of said cartridge and said pusher elements being loadable into said slots through said open ends, a retaining means comprising an elongate bar extending in said passageway adjacent to said one face of said cartridge and in the plane of movement of said pusher element cam portions.

22. The cartridge assembly of claim 21, said elongate bar being insertable into said passageway by being slid therein form one end of said cartridge.

23. The cartridge assembly of claim 21, said retaining bar including a recess along one longitudinal edge thereof proximate to one end thereof and bounded forwardly and rearwardly by raised portions relative to the major length of said one edge, said raised portions being of yieldable material.

24. The assembly of claim 21, said pusher elements each comprising a rectangular plate portion having a rail along the forward and rear vertical ends thereof, a groove in the forward and rear vertical end walls of each said slots, said rails fitting closely within said slots to thereby maintain the alignment of said pusher elements about their respective vertical axes.

25. The assembly of claim 21, said cam portion having a rectilinear cam surface including an apex point along the central vertical axis of said pusher element.

References Cited

UNITED STATES PATENTS

| | | |
|---|---|---|
| 3,079,606 | 3/1963 | Bobrov et al. |
| 3,315,863 | 4/1967 | O'Dea _______________ 227—19 |
| 3,317,105 | 5/1967 | Astafjev et al. ____ 227—19 XR |

TRAVIS S. McGEHEE, Primary Examiner